Dec. 10, 1957 S. LANDELL 2,815,986
WHEEL COVER
Filed Aug. 27, 1953
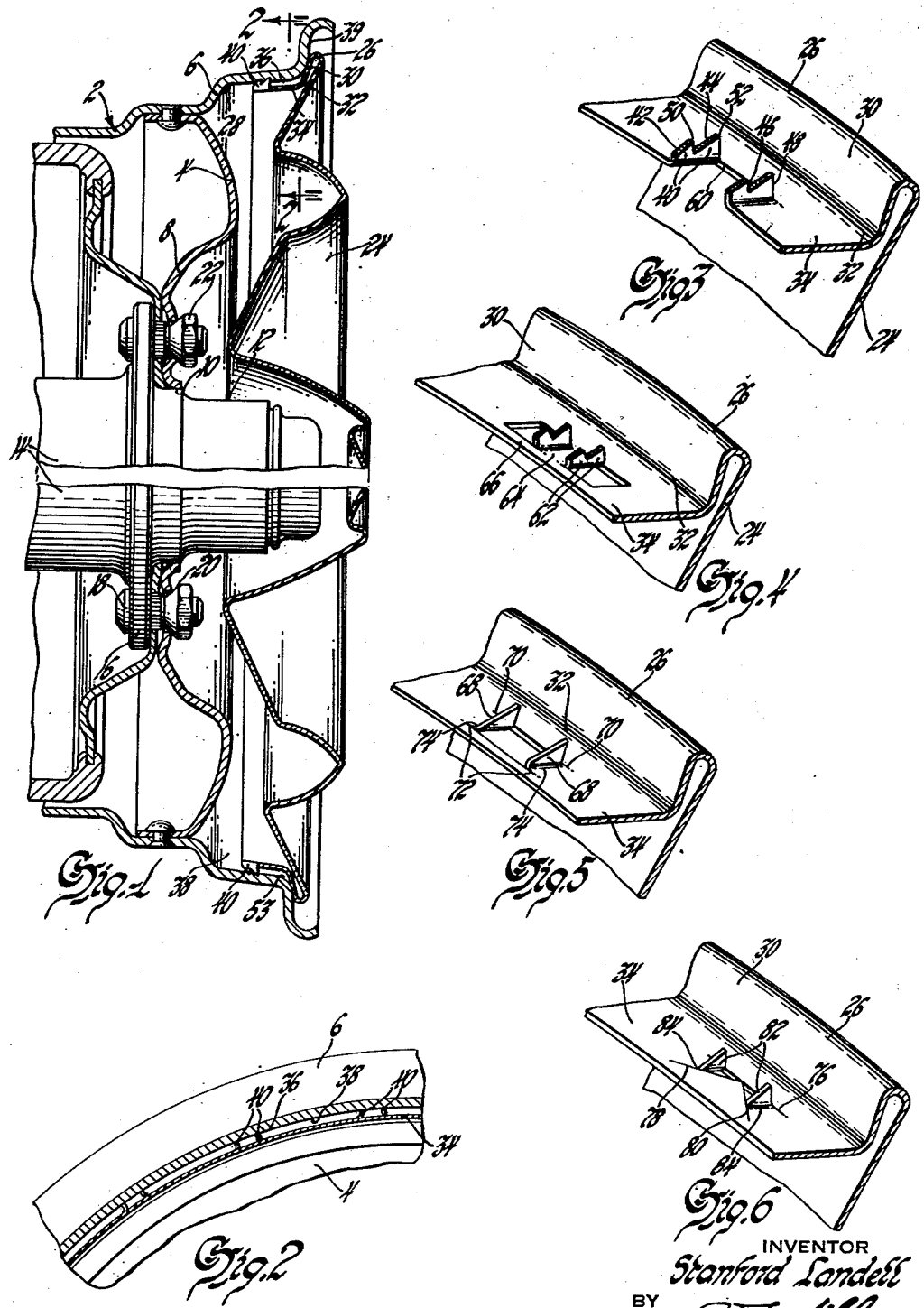
INVENTOR
Stanford Landell
BY
C. H. Sibbe
ATTORNEY

United States Patent Office 2,815,986
Patented Dec. 10, 1957

2,815,986
WHEEL COVER

Stanford Landell, Fayetteville, N. Y., assignor to General Motors Corporation, Detroit, Mich., a corporation of Delaware Application August 27, 1953, Serial No. 376,890

9 Claims. (Cl. 301—37)

This invention relates to vehicle wheel covers and more particularly to one-piece disc type covers adapted for disposition over the outer side of a vehicle wheel.

It is well known in the prior art to provide wheel covers having spaced at intervals therearound a plurality of individually attached wheel engaging spring fingers which are axially rigid but radially flexible. Such clips are usually formed of relatively long spring blades having their end portions struck-up at right angles, the struck-up portions being formed with inclined leading edges and vertical trailing edges. A plurality of such clips are customarily riveted at spaced intervals circumferentially on the inner surface of an intermediate annular flange associated with the cover, the struck-up portion extending through apertures in the flange to occupy a position such that the inclined leading edges initially engaged an intermediate flange on the wheel rim. Upon application of manual pressure to the cover, the struck-up portions deflected inwardly for resilient slidable movement axially of the wheel rim flange. Because of the vertical trailing edge on the struck-up portions, reverse movement of the cover caused the fingers to bite or dig into the intermediate flange of the tire rim and resist outward movement of the cover. While cover retaining clips of this type proved entirely satisfactory, the increased cost of parts and additional assembly time required to fabricate a wheel cover with individually attached clips of this type has heretofore outweighed their mechanical advantages.

A principal object of the present invention is to provide a one-piece wheel cover construction having integral axially rigid, radially resilient cover retaining means.

Another object is to provide an improved ornamental and protective cover for the outer side of a vehicle wheel which cover may be easily and positively secured in position by the application of manual pressure, but which is highly resistant to accidental removal resulting from road shock.

Yet another object is to provide a one-piece wheel cover construction which is simple in construction, low in cost and efficient in operation.

These, other objects, features and advantages of the invention will be readily apparent from the following description of certain preferred embodiments and taking into conjunction the accompanying drawings wherein:

Fig. 1 is a front elevational view, partly in section, of a vehicle wheel and a wheel cover assembly embodying the novel features of the invention.

Fig. 2 is an enlarged fragmentary sectional view of a portion of the wheel and cover assembly taken substantially along the lines 2—2 of Fig. 1.

Fig. 3 is an enlarged fragmentary perspective view of a portion of the cover assembly illustrating one form of the invention.

Fig. 4 is an enlarged fragmentary perspective view similar to Fig. 3 showing a modified form of the invention.

Fig. 5 is a view similar to Fig. 4 showing a further modification of the invention, and Fig. 6 is a perspective view similar to Fig. 5 showing a still further modification.

Referring now to the drawings and particularly Fig. 1, there is illustrated a conventional vehicle wheel 2 comprising an outwardly bowed wheel body 4 having a multi-flanged drop center rim 6 secured at the outer periphery thereof. Wheel body 4 is formed with a central dished portion 8 having a flanged aperture 10 at the center thereof which is adapted for sliding cooperation over the hub 12 of a vehicle axle 14. Radially arranged around a flange 16 formed on hub 12 and rigidly secured therein are a plurality of axially directed wheel bolts 18 which extend outwardly through radially arranged apertures 20 formed in the dished portion 8 of wheel body 4. Upon tightening wheel nuts 22 on bolts 18, the wheel 2 may be drawn into tight engagement against flange 16.

Disposed in covering relation over the outer side of wheel 2 is a circular wheel cover 24 which, as illustrated, is of compound angularity in cross section. It will be understood, however, that the cross-sectional configuration of the cover forms no part of the invention and may take any desired form. As seen best in Fig. 1, cover 24 is provided with a rearwardly inturned peripheral margin 26 which extends radially inwardly in converging relation with the rear surface 28 of cover 24 to form a radially inclined flange 30. At its radially inner margin 32, inclined flange 30 is turned axially rearwardly to form an axially directed annular flange 34. Annular flange 34 is preferably of a diameter somewhat less than the inside diameter of the intermediate flange 36 of vehicle wheel rim 6, while radially inclined flange 32 is adapted to axially abut the annular shoulder 39 of rim 6.

To secure cover 24 in position in the opening formed by intermediate flange 36 in accordance with the present invention, axially directed annular flange 34 is provided with a continuous series of circumferentially spaced pairs of gripping fingers 40.

As seen best in Fig. 3, fingers 40 are struck-up vertically from the surface of flange 34 and are aligned in parallel relation in a direction transverse to the plane of the flange. Each finger 40 is notched to provide axially forwardly and upwardly inclined leading edges 42 and 44, which terminate at vertically directed trailing edges 46 and 48 to form biting edges 50 and 52. When struck-up in planes parallel to the direction of thrust, it will be apparent that the fingers 40 will be virtually rigid axially. In order to provide varying degrees of resiliency in the fingers, flange 34 may be slit circumferentially any desired amount adjacent the trailing edges 46 and 48. However, the notched portions 60 resulting from striking-up fingers 40 serve to reduce the inherent stiffness of flange 34 sufficient to normally render additional slitting unnecessary.

With gripping fingers formed and arranged in the manner described, it will be seen that when the cover member 24 is disposed over the opening 38, the leading edges 42 and 44 initially abut the annular shoulder 53 of wheel rim 6. Upon application of manual pressure, fingers 40 cam downwardly causing the adjacent portions of flange 34 to flex radially inwardly to permit fingers 40 to slide along intermediate flange 36. As cover 24 is forced progressively into the opening formed by flange 36, radially inclined flange 30 approaches and resiliently abuts annular shoulder 53 to axially locate the cover. Conversely, any tendency toward outward movement of cover 24 induces biting edges 50 and 52 of fingers 40 to dig into the intermediate flange 36.

In Fig. 4 there is illustrated a modified form of the invention wherein the midportion of flange 34 is lanced at circumferentially spaced intervals to provide pairs of fingers 62. In this embodiment, fingers 62 have a common juncture 64 with the flange 34 and extend therefrom in opposite directions. Fingers 62 are subsequently struck-up vertically from the periphery of flange 34 in planes normal thereto. By forming fingers 62 intermediately of flange 34, the inherent stiffness of the flange is substantially retained. However, the narrow connecting portions 66 at the terminal edge of flange 34 are sufficiently resilient to permit radial inward flexing of fingers 62 during application with the cover. It will also be seen that this construction provides an unbroken inner peripheral edge on flange 34, thereby substantially reducing the likelihood of injury as a result of handling the cover.

In the modification shown in Fig. 5, flange 34 is lanced at spaced intervals to form opposed fingers 68 which are subsequently struck-up from the surface of the flange in the same manner as previously described. In this embodiment, it is important to note that the slits 70 and 72 extend circumferentially a distance sufficient to provide fingers 68 with flexible root portions 74 which normally lie in the circumference of the flange. It will be apparent that by varying the length of slits 70 and 72, any desired degree of flexibility may be imparted to fingers 68.

In Fig. 6, there is shown a further modification wherein the flange 34 is lanced at spaced intervals with a circumferentially extending straight slit 76 and a pair of forwardly converging slits 78 and 80 to form a pair of generally V-shaped opposed fingers 82. The inner extremities of fingers 82 are then struck-up, as previously described. By forming fingers 82 in this manner, the root portions 84 thereof provide progressively increasing resistance to flexing toward their outer extremities, thus assuring more even distribution of tension resulting from application of the cover to a wheel.

From the foregoing it will be seen that a novel and simplified cover construction has been provided which is low in cost, simple to manufacture and efficient in operation.

While several embodiments have been shown and described, it will be apparent that other changes and modifications may be made therein without departing from the invention. It is, therefore, to be understood that it is not intended to limit the invention to the embodiment shown but only by the scope of the claims which follow.

I claim:

1. A circular sheet metal cover for a vehicle wheel, said cover having an inturned outer margin providing a radially inclined annular flange spaced axially rearwardly of said cover, an axially rearwardly directed annular flange integral with said inclined flange, and a plurality of circumferentially spaced vertically directed finger portions struck outwardly from said axial flange, each of said finger portions being provided with axially inclined leading edges and vertically directed trailing edges, the major dimension of said fingers lying in planes normal to the surface of said axial flange.

2. A circular sheet metal wheel cover for a vehicle wheel including a multi-flanged tire rim, said cover comprising a surface portion having a rearwardly inturned margin, a radially inclined annular flange, an axially rearwardly directed annular flange integral with said inclined flange, and means on said last mentioned flange bent to form rim engaging fingers, each of said fingers being disposed in planes normal to the plane of said wheel, said fingers being provided with notched terminal edged portions adapted to permit yieldable slidable movement of said cover in one direction and to resist movement thereof in the opposite direction.

3. A circular sheet metal wheel cover for a vehicle wheel including a multi-flanged tire rim, said cover comprising a surface portion having a rearwardly inturned margin forming a radially inclined annular flange, an axially rearwardly directed annular flange integral with said inclined flange, and means on said last mentioned flange struck-up vertically therefrom to form rim engaging fingers, each of said fingers being disposed in planes normal to the surface of said cover, said fingers extending from the terminal edge of said axial flange to the midportion thereof and being provided with notched extremities adapted to permit yieldable slidable movement of said cover in one direction and to resist movement thereof in the opposite direction.

4. A circular sheet metal wheel cover for a vehicle wheel including a multi-flanged tire rim, said cover comprising a surface portion having a rearwardly inturned margin forming a radially inclined annular flange, an axially rearwardly directed annular flange integral with said inclined flange, and means axially intermediate said last mentioned flange struck-up vertically therefrom to form rim engaging fingers, each of said fingers being disposed in planes normal to the surface of said cover, said fingers being provided with notched extremities adapted to permit yieldable slidable movement of said cover in one direction and to resist movement thereof in the opposite direction.

5. In a cover structure for a vehicle wheel including a multiflanged tire rim, cover retaining means comprising a continuous annular flange disposed in concentric relation with said cover at the rear surface thereof and adapted for nesting relation within said rim, said flange being lanced at spaced intervals circumferentially thereof to provide reversely similar finger portions, said finger portions being struck upwardly from the periphery of said flange at right angles thereto, and means on said fingers adapted to permit axial inward movement of said cover on said wheel and to resist axial outward movement thereof, said means comprising terminal portions having alternating inclined edges and vertically directed edges cooperable with said rim.

6. In a cover structure for a vehicle wheel including a multiflanged tire rim, cover retaining means comprising a continuous annular flange disposed in concentric relation with said cover at the rear surface thereof and adapted for nesting relation within said rim, said flange being lanced at spaced intervals circumferentially thereof to provide reversely similar finger portions, said finger portions being struck upwardly toward each other from the periphery of said flange at right angles thereto, and means on said fingers adapted to permit axial inward movement of said cover on said wheel and to resist axial outward movement thereof, said means comprising terminal portions having alternating inclined edges and vertically directed edges cooperable with said rim.

7. In a cover structure for a vehicle wheel including a multiflanged tire rim, cover retaining means comprising a continuous annular flange disposed in concentric relation with said cover at the rear surface thereof and adapted for nesting relation within said rim, said flange being lanced at spaced intervals circumferentially thereof to provide reversely similar finger portions, said finger portions being struck upwardly away from each other from the periphery of said flange at right angles thereto, and means on said fingers adapted to permit axial inward movement of said cover on said wheel and to resist axial outward movement thereof, said means comprising terminal portions having alternating inclined edges and vertically directed edges cooperable with said rim.

8. In a cover structure for a vehicle wheel including a multiflanged tire rim, cover retaining means comprising a continuous annular flange disposed in concentric relation with said cover at the rear surface thereof and adapted for nesting relation within said rim, said flange being lanced at spaced intervals circumferentially thereof to provide reversely similar opposed fingers, the extremities of said fingers being struck upwardly from the periphery of said flange at right angles thereto, and means on said fingers adapted to permit axial inward movement of said cover on said wheel and to resist axial outward movement thereof, said means comprising terminal portions on said fingers having alternating inclined edges and vertically directed edges cooperable with said rim.

9. In a cover structure for a vehicle wheel including a multiflanged tire rim, cover retaining means comprising a continuous annular flange disposed in concentric relation with and rearwardly of said cover, said flange being lanced at circumferentially spaced intervals to provide reversely similar pairs of fingers, said fingers having their frontal edges lying in a common vertical plane and their distal edges lying in a common inclined plane intersecting said frontal edge, each of said fingers being vertically struck-up midway thereof to provide radially resilient axially rigid engagement wtih said rim.

References Cited in the file of this patent

UNITED STATES PATENTS

| | | |
|---|---|---|
| 1,800,173 | Anderson | Apr. 7, 1931 |
| 1,889,070 | Hyatt | Nov. 29, 1932 |
| 2,196,990 | Hunt | Apr. 16, 1940 |
| 2,660,478 | Lyon | Nov. 24, 1953 |